(12) United States Patent
Welker et al.

(10) Patent No.: US 10,689,302 B2
(45) Date of Patent: Jun. 23, 2020

(54) SYSTEM, METHOD AND APPARATUS FOR ENTRAINING AIR IN CONCRETE

(71) Applicant: MACH IV, LLC, Dallas, TX (US)

(72) Inventors: Charles D. Welker, Dallas, TX (US); Norman Scott Smith, Arlington, TX (US)

(73) Assignee: MACH IV, LLC, Dallas, TX (US)

(*) Notice: Subject to any disclaimer, the term of this patent is extended or adjusted under 35 U.S.C. 154(b) by 196 days.

(21) Appl. No.: 15/435,451

(22) Filed: Feb. 17, 2017

(65) Prior Publication Data

US 2017/0158567 A1 Jun. 8, 2017

Related U.S. Application Data

(63) Continuation of application No. 13/785,040, filed on Mar. 5, 2013, now Pat. No. 9,593,050, which is a (Continued)

(51) Int. Cl.
*C04B 38/10* (2006.01)
*B28C 7/02* (2006.01)
(Continued)

(52) U.S. Cl.
CPC .......... *C04B 38/10* (2013.01); *B01F 3/04439* (2013.01); *B01F 3/04446* (2013.01);
(Continued)

(58) Field of Classification Search
CPC ................ C04B 38/10; C04B 40/0032; C04B 2103/304; C04B 28/02; C04B 38/00;
(Continued)

(56) References Cited

U.S. PATENT DOCUMENTS

| 1,024,221 A | 4/1912 | Osgood |
| 1,559,666 A | 11/1925 | Bernier |

(Continued)

FOREIGN PATENT DOCUMENTS

WO 199857906 12/1998

OTHER PUBLICATIONS

PCT: International Search Report and Written Opinion of PCT/US2011/1029330; dated Dec. 20, 2011; 11 pages.

*Primary Examiner* — Tony G Soohoo
(74) *Attorney, Agent, or Firm* — Katarzyna Brozynski; Antonio Devora

(57) ABSTRACT

A method of preparing a concrete composition for downhole injection includes utilizing a controller to control a process including circulating process water in a process water supply loop for a predetermined period while monitoring and controlling the temperature and flow rate of the process water, circulating aqueous-based air entrainment solution in an aqueous-based air entrainment solution supply loop for the predetermined period and controlling the flow rate of the aqueous-based air entrainment solution and after the predetermined period of time in which the flow of process water and aqueous-based air entrainment solution have stabilized, simultaneously actuating valves to divert and mix the process water, the aqueous-based air entrainment solution and compressed air to produce an air-entrained foam and mixing the foam with a concrete composition to be deployed downhole.

12 Claims, 10 Drawing Sheets

Related U.S. Application Data continuation-in-part of application No. 12/748,883, filed on Mar. 29, 2010, now Pat. No. 8,408,781, which is a continuation-in-part of application No. 11/709,932, filed on Feb. 21, 2007, now abandoned.

(60) Provisional application No. 60/775,571, filed on Feb. 21, 2006.

(51) Int. Cl.
| | |
|---|---|
| *B01F 3/04* | (2006.01) |
| *B01F 15/00* | (2006.01) |
| *B28C 5/00* | (2006.01) |
| *C04B 38/00* | (2006.01) |
| *B28C 5/38* | (2006.01) |
| *B01F 15/04* | (2006.01) |
| *B28C 9/02* | (2006.01) |
| *C04B 40/00* | (2006.01) |
| *E21B 33/14* | (2006.01) |
| *B28C 7/04* | (2006.01) |
| *C09K 8/42* | (2006.01) |
| *G05B 15/02* | (2006.01) |
| *E21B 33/13* | (2006.01) |

(52) U.S. Cl.
CPC .... *B01F 3/04992* (2013.01); *B01F 15/00136* (2013.01); *B01F 15/00253* (2013.01); *B01F 15/00396* (2013.01); *B01F 15/0437* (2013.01); *B28C 5/003* (2013.01); *B28C 5/386* (2013.01); *B28C 5/388* (2013.01); *B28C 7/02* (2013.01); *B28C 7/026* (2013.01); *B28C 7/0472* (2013.01); *B28C 9/02* (2013.01); *C04B 38/00* (2013.01); *C04B 40/0032* (2013.01); *C09K 8/42* (2013.01); *E21B 33/14* (2013.01); *G05B 15/02* (2013.01); *B01F 2215/0047* (2013.01); *B01F 2215/0081* (2013.01); *B28C 5/381* (2013.01); *B28C 7/04* (2013.01); *B28C 7/0454* (2013.01); *E21B 33/13* (2013.01)

(58) Field of Classification Search
CPC .......... B01F 15/00136; B01F 15/00253; B01F 15/00396; B01F 2215/0047; B01F 2215/0081; B01F 3/04439; B01F 3/04446; B01F 3/04992; B28C 5/003; B28C 5/381; B28C 5/386; B28C 5/388; B28C 7/02; B28C 7/026; B28C 7/04; B28C 7/0454; B28C 7/0472; B28C 9/02; C09K 8/42; E21B 33/13; E21B 33/14; G05B 15/02

See application file for complete search history.

(56) References Cited

U.S. PATENT DOCUMENTS

| | | | | |
|---|---|---|---|---|
| 3,236,925 | A | * | 2/1966 | Urmston ............ B28C 5/003 106/642 |
| 3,811,660 | A | * | 5/1974 | Cole, Jr. ............ E21F 5/00 261/18.1 |
| 4,344,859 | A | * | 8/1982 | Burke, Jr. ............ C08J 3/03 366/124 |
| 4,697,960 | A | * | 10/1987 | Pelto ............ E21D 20/023 366/10 |
| 4,789,244 | A | * | 12/1988 | Dunton ............ B01F 3/04992 366/101 |
| 4,872,913 | A | * | 10/1989 | Dunton ............ B01F 3/04992 521/55 |
| 5,066,428 | A | * | 11/1991 | Manlowe ............ B01F 3/04992 261/29 |
| 5,145,014 | A | * | 9/1992 | Eberhardt ............ A62C 5/02 169/13 |
| 5,403,125 | A | | 4/1995 | Andersen |
| 5,450,346 | A | * | 9/1995 | Krummen ............ G05B 19/058 700/11 |
| 5,556,033 | A | * | 9/1996 | Nachtman ............ A01G 13/0287 239/10 |
| 5,775,047 | A | | 7/1998 | Jensen |
| 5,795,060 | A | * | 8/1998 | Stephens ............ B01F 3/12 366/10 |
| 5,803,596 | A | * | 9/1998 | Stephens ............ A62C 5/02 169/15 |
| 6,153,005 | A | | 11/2000 | Welker et al. |
| 6,425,950 | B1 | * | 7/2002 | Leitsch ............ B01F 3/04985 106/672 |
| 6,488,088 | B1 | | 12/2002 | Kohli et al. |
| 6,538,040 | B1 | * | 3/2003 | Okuda ............ B01F 3/04446 261/DIG. 26 |
| 6,676,862 | B2 | * | 1/2004 | Jensen ............ B28B 1/50 264/39 |
| 7,427,321 | B2 | | 9/2008 | Hilton et al. |
| 7,621,995 | B2 | | 11/2009 | Gray |
| 7,670,426 | B2 | | 3/2010 | Gray |
| 7,766,537 | B2 | * | 8/2010 | Gembala ............ B01F 3/04446 261/DIG. 26 |
| 8,167,997 | B2 | | 5/2012 | Gray |
| 8,408,781 | B2 | | 4/2013 | Welker et al. |
| 8,673,088 | B1 | * | 3/2014 | Suiter, II ............ B01F 3/04446 134/22.11 |
| 8,871,021 | B2 | | 10/2014 | Gray |
| 2003/0125405 | A1 | | 7/2003 | Hilton et al. |
| 2004/0092614 | A1 | | 5/2004 | Hilton et al. |
| 2005/0195681 | A1 | * | 9/2005 | Gembala ............ B28C 9/0454 366/46 |
| 2008/0028988 | A1 | * | 2/2008 | Welker ............ B01F 3/04446 106/316 |
| 2008/0103748 | A1 | | 5/2008 | Axelrud et al. |
| 2010/0193201 | A1 | * | 8/2010 | Zeller ............ A62C 5/02 169/46 |
| 2010/0246312 | A1 | * | 9/2010 | Welker ............ B01F 3/04439 366/4 |
| 2018/0354854 | A1 | * | 12/2018 | Chaumilliat ............ C04B 22/148 |

\* cited by examiner

SYSTEM, METHOD AND APPARATUS FOR ENTRAINING AIR IN CONCRETE

CROSS-REFERENCE TO RELATED APPLICATIONS

This application is a continuation of U.S. application Ser. No. 13/785,040, filed Mar. 5, 2013, which is a continuation in part of U.S. application Ser. No. 12/748,883, filed Mar. 29, 2010, now U.S. Pat. No. 8,408,781, issued Apr. 2, 2013, which is a continuation in part of U.S. application Ser. No. 11/709,932, filed Feb. 21, 2007, which claims priority from U.S. Provisional Application No. 60/775,571, filed Feb. 21, 2006. Each of the above-listed patent applications is incorporated herein by reference in its entirety to provide continuity of disclosure.

TECHNICAL FIELD

A system, method and apparatus for entraining air in concrete for downhole injection is disclosed. In particular, a system and method utilizing an aqueous-based air entrainment solution foam to incorporate air in concrete as the cement slurry is prepared for a downhole cementing and/or the concrete is batched is set forth.

BACKGROUND

It is desirable to entrain air in concrete for a variety of reasons. For example, when concrete is to be exposed to moisture, deicers and freeze/thaw temperature cycles, it is necessary to entrain air in the concrete to avoid cracking and crumbling due to hydraulic pressures produced in the pores and capillaries of the concrete as the moisture freezes. The use of entrained air may also reduce the amount of cement required, reducing the cost of the mix. However, in the case of moderate to high strength concrete, each percent of entrained air (volume basis) will reduce the compressive strength of the cured concrete. This reduction in compressive strength will vary with the particular concrete blend, the physical and chemical properties of the blend components, e.g., cement, sand, rock, admixtures etc. Further, currently used air-entrainment admixtures and systems do not provide the desired degree of consistency and repeatability in terms of the volume of air-entrained in concrete. This, in turn requires recalibration of the amount of admixtures added to the concrete and the use of additional cement in the blend to ensure that the resulting product meets the required specifications for the particular application.

Also, the air-entrained cementing (lightweight cementing) with its particular type known also as "foamed cementing" or "cellular cementing" has been utilized in a wellbore cementing to reduce the density of the cement column thereby reducing the hydrostatic pressure of the cement slurry column on the rock formations. Simply, lightweight cements are desirable because they will exert less hydrostatic pressure on the rock formation. If the formation fractures during the cementing process, the cement will enter the formation and compromise the ability to place cement along the entire wellbore; this, ultimately, causes a poor or failed cementing of the wellbore. The lightweight cement is of particular usefulness in weak formations, i.e. in formations having relatively low fracture gradient. Foamed cement has several advantages in addition to its low density. It has relatively high compressive strength (which is developed in a reasonable time), causes less damage to water-sensitive formations, can reduce the chance of annular gas flow, and allows cementing past zones experiencing total losses.

Cementing of the wellbore is performed when the cement slurry is deployed into the well via pumps. The cement slurry displaces the drilling fluids remaining within the well, and replaces the fluids with cement. Preferably, such displacement should be performed in a continuous manner such that there is no interruption to the flow of cement. Such process requires a continuous delivery of a desired quality and quantity of cement slurry so that the first cement down the hole remains stable until last cement is placed after one continuous operation. Then, the cement must remain stable while it is static up and until the time it sets or hardens. This can take up to 4-6 hours to place cement and up to 12 hours for the cement to set uphole where the temperatures are cooler than the bottom of the well. The cement slurry flows to the bottom of the wellbore through the casing. From there, it fills in the annular space between the casing and the wellbore, and hardens or sets. The hardened cement creates a seal so that outside materials (including gases) cannot enter the well flow, as well as permanently positioning and protecting the casing in place.

Downhole cementing poses particular problems caused by changing temperatures and hydrostatic pressure along the cement column, thus making conventional cement preparation and composition practically unsuitable for a downhole cementing.

Preparing slurry having the required physical properties is essential before commencing cementing operations. The proper cement chemistry must be determined, and the mix prepared to provide slurry having the required density and viscosity before the slurry is pumped into the hole. Special mixers, including hydraulic jet mixers, re-circulating mixers or batch mixers, are used to combine dry cement with water to create the wet cement. The cement used in the well cementing process is Portland cement, and it is typically prepared with additives to form one of a number of different API classes of cement. Each is employed for various situations. Additives can include accelerators, which shorten the setting time required for the cement, as well as retarders, which do the opposite and make the cement setting time longer. In order to decrease or increase the density of the cement, lightweight and heavyweight additives are added. Additives can be added to transform the compressive strength of the cement, as well as flow properties and dehydration rates. Extenders can be used to expand the cement in an effort to reduce the cost of cementing, and antifoam additives can be added to prevent foaming within the well. In order to plug lost circulation zones, bridging materials are added, as well.

Depending upon the particular formation, bore depth equipment and other factors, it may be necessary or desirable to mix additives with the cement to retard setting, accelerate setting time, control fluid loss in the cement, gel the cement and reduce or increase the slurry density. Additives may be used to increase the mechanical strength of the cement when set, reduce the effect of mud on the cement and to improve the cement bonding. Additives are typically mixed with the cement as the slurry is prepared and before the cement is pumped into the well. In some cases, there may be different pozzolanic materials combined with the cement itself but, as noted above, typically Portland cement is blended with additives and/or modified to accommodate wellbore conditions such as temperatures up to or greater than 600 degrees Fahrenheit. In different variations, binders other than Portland cement may be used, for example, fly ash and other pozzolanic materials.

The physical characteristics of Portland cement and similar binders may tend to create a drag effect, affecting the flow characteristics of the cement. In particular, Portland cement particles have a generally flat shape that creates a drag effect, reducing the flowability of the cement. Adding components such as fly ash in combination with Portland cement can alleviate some of this drag effect, but the addition of fly ash may create other issues such as variability in the heat of hydration of the cement and/or the set time of the cement. Variability in the physical and chemical properties of fly ash utilized as an additive in oilfield cement can also increase variability in the chemistry and physical properties of the slurry. Such variability may be small; however, in well cementing applications, the effect of such variability can be significant.

Water is of course, necessary to hydrate the Portland cement and provide appropriate flow properties. However, if excessive water is used, separation of the water from the cement mixture may occur, especially once the cement stops flowing. Excessive water may also cause loss of strength, excessive shrinkage and variability in hydraulic pressure, which may be detrimental in different applications. Fluid loss additives may be used to reduce a segregation and separation of wellbore cement components and compensate for water imbalance. Fluid loss additives are designed to keep the cement slurry more cohesive over a range of common variables and to mitigate the effect of excessive water in the slurry. However, the increased cohesiveness of the slurry tends to reduce the flow rate of the cement slurry into the bore. One way of improving the flow properties of the cement slurry and/or compensating for the effect of fluid loss products, is to entrain air into the slurry as or before the slurry is injected into the bore.

During the manufacturing of the foamed cement, conventional air entrainment techniques typically use surfactant formulations which are largely or totally anionic based compositions added to cement slurries. Methods using these compositions are practically unable to compensate for large changes in cement and/or pozzolanic chemistry, agitation conditions, slurry temperatures and other factors that change the characteristics of the slurry. Variations in these parameters limit the capability to predict or calculate slurry yield volume and/or the quality of the air entrainment in the slurry injected into the well. Unstable slurries result in a pore structure which is nonspherical and interconnected. This phenomenon occurs while the cement sets. It is caused by a rupture of unstable nitrogen bubble walls (conventional foam cementing usually utilizes disperse gases such as nitrogen) upon contact with other nitrogen bubbles, resulting in coalescence and larger gas pockets. This results in a sponge-like structure with lower compressive strength, higher permeability, and inferior bonding properties. This inability to control sources of variability and/or to compensate for the effects of these sources of variability limits the desirability of utilizing air entrainment (foamed gas) as a method of adjusting slurry parameters or limiting the amount of cement used in the slurry for downhole injection.

It is possible to find a single gas-to-base slurry ratio (a "constant gas ratio"), which satisfies the boundary condition (density of the lead slurry, fracture pressure profile, pore pressure profile, formation permeability) of usually shallower formations. Operationally, this is the simplest method, because the gas injection (air or nitrogen) rate remains constant during the cement job. This method results in a variable foam quality throughout the cement column, with a low density at the top, and the constantly increasing density with depth because of hydrostatic compression of the well bore. However, due to a variable hydrostatic pressure and temperatures in a wellbore environment, there is a need to produce cement slurry of variable density to account for a changing hydrostatic pressure in a wellbore column. These real time adjustments in a density of the cement slurry pose a challenge which prior art has yet to solve, for it requires complex pumping schedule with close coordination and control of the treatment on location.

Accordingly, there is a need for safer and more cost-effective downhole cementing system and method that manufactures lightweight, cellular cement in a continuous or a batch process. There is also a need for producing stable and homogeneous cement slurry for a downhole cementing of a wellbore having physical and chemical characteristic which preserve compressive strength at high temperature. There is also further need for well cementing that increases productivity of the well by avoiding the downtime caused by abandoning the well in case of a poor/inadequate cementing job. Thus, there is a need for producing stable, cellular cement slurry with predictable chemical and physical characteristics which assures longevity and safer operation of a producing well. Simply, it is desirable to produce stable cement slurry having air entrained component for a downhole cementing.

SUMMARY

A system for preparing a concrete composition including entrained air for downhole injection includes a controller for controlling the system, the controller having one or more communications interfaces for communicating with system components such as instruments, sensors, meters, position indicators and for transmitting control signals. The controller may be operable to compare signals received from various instruments such as flow, temperature and pressure sensors, compare the signals to preprogrammed values and make process adjustments when the values vary from the preprogrammed values. For example, the controller may be operable to adjust the speed of a pump to control a flow rate. A data storage device associated with the controller may be used for storing predetermined process parameters such as flow rates, pressures and temperatures and for storing historical data.

In one embodiment, the system includes a process water supply circuit for providing temperature controlled process water to produce air-entrained foam. The process water supply circuit may include a process water supply tank having a temperature monitoring device and a level detecting device. The temperature monitoring device and level detecting device provide signals to the controller indicating the level of process water in the water supply tank and the temperature of the process water in the process water supply tank. In one variation, a closed loop circulating system is used to control the temperature of the water in the process water supply tank. As dictated by environmental requirements, a closed loop circulation system includes a circulating pump, water heater and/or refrigeration system. The circulating pump pumps water from the process supply tank through the water heater when the water is below set point or passes through the cooling system when the water is above set point, then it goes back into the process tank. The closed loop circulating system is controlled by the controller which receives a signal from the temperature monitor which energizes the circulation pump as well as the heating or cooling device respectively.

The process water supply circuit further includes a process water circulating loop including a process water supply pump that pumps water from the process water supply tank through the process water circulating loop and back to the process water supply tank. The process water supply pump is driven by a first variable speed drive under the control of the controller which may compare a signal from a flow meter in the process water circulating loop to a preprogrammed set point and adjust the speed of the drive if the flow varies from the set point. A first valve in the process water circulating loop may be actuated by the controller to divert process water from the process water circulating loop to produce air-entrained foam.

The system further comprises an aqueous-based air entrainment solution supply circuit for providing an aqueous-based air entrainment solution for producing air-entrained foam. In one embodiment, the aqueous-based based air entrainment solution is a polymer-based solution. The polymer-based solution supply circuit may include a polymer-based solution batch tank having a polymer-based solution level detecting device for monitoring the level of polymer-based solution in the batch tank. The polymer-based solution level detecting device transmits a signal to the controller that indicates the level of polymer-based solution in the tank. The controller may add polymer-based solution to the batch tank by pumping additional polymer-based solution from a bulk tank and/or annunciate an alarm to notify an operator of a low level condition in the tank.

The polymer-based solution supply circuit further includes a polymer-based solution circulating loop with a polymer-based solution supply pump for pumping polymer-based solution from the polymer-based solution batch tank through the polymer-based solution circulating loop and back to the polymer-based solution batch tank. The polymer-based solution supply pump may be driven with a second variable speed drive under the control of the controller. A flow meter in the polymer-based solution supply circuit transmits a signal to the controller which compares the flow rate to a preprogrammed set point and adjusts the speed of the drive to correct the flow rate as necessary. The controller may also annunciate an alarm if the polymer-based solution flow rate varies from the preprogrammed set point. The controller may reposition a second valve in the polymer-based solution circulating loop to mix with the process water to produce an air-entrained foam.

A compressed air supply may include a particulate filter for removing particulates from the air and a dryer for drying the compressed air. Compressed air is supplied to the system through a pressure regulator and an air supply valve operating under the control of the controller.

In operation, process water and polymer-based solution are circulated through their respective circulating loops for a predetermined period to stabilize the flows and the process water temperature before the first and second valves are actuated to divert process water and polymer-based solution to a mixing chamber. Compressed air is added to the blended process water and polymer-based solution down stream of the mixing chamber where compressed air is added to the stream. The stream of process water, polymer-based solution and compressed air is directed through a stationary mixer to produce an air-entrained foam. The air-entrained foam is discharged through a discharge line for mixing with a concrete composition to form an air-entrained concrete, and further deployed into the wellbore to set in a cement column having constant density.

According to one embodiment of the present disclosure, the system described herein is capable of producing a single gas-to-base slurry ratio (a "constant gas ratio").

In one embodiment, the system also includes a pressure sensor in the discharge line that transmits a signal to the controller. The controller is operative to actuate an alarm when the signal from the pressure sensor indicates a variance in one of the flow of process water, the flow of the polymer-based solution or a change in the pressure of the compressed air used to produce the air-entrained foam.

In one embodiment, a process for preparing a concrete composition including entrained air for downhole injection includes circulating water and polymer-based solution in closed circuits for a predetermined period before mixing to allow process parameters to stabilize before producing air-entrained foam. Accordingly, the process includes circulating process water in a process water supply circuit for a predetermined period while monitoring the flow rate of the process water in the water supply circuit with a flow meter and transmitting a flow rate signal to a controller. The flow rate of the process water is compared to a preprogrammed process water flow rate range with the controller. If the flow rate is outside of the preprogrammed range, the controller transmits a signal to, for example, a variable speed pump drive, to adjust the flow rate of the process water. The temperature of the process water is also monitored with a temperature sensor which transmits the temperature to the controller which compares the process water temperature to a preprogrammed process water temperature range. If the temperature of the process water falls below the preprogrammed process water temperature range, the controller transmits a signal to a heating device to adjust the temperature of the process water.

In one aspect, polymer-based solution is circulated in a polymer-based solution supply circuit during the predetermined period while monitoring the flow rate of the polymer-based solution in the polymer-based solution supply circuit with a flow meter. The flow meter transmits a signal to the controller which compares the flow rate of the polymer-based solution in the polymer-based solution supply circuit to a preprogrammed polymer-based solution flow rate range and transmits a signal to adjust the polymer-based solution flow rate if the polymer-based solution flow rate is outside of the programmed range. The pressure of a compressed air supply used to produce the air-entrained foam is also monitored with a pressure sensor which transmits the pressure to the controller which in turn compares the pressure of the compressed air supply to a preprogrammed air pressure range.

After the predetermined period, if the process parameters are stabilized within the preprogrammed ranges, the process water flow rate is within the preprogrammed process water flow rate and the process water temperature is within the preprogrammed process water temperature range and the polymer-based solution flow rate is within the preprogrammed polymer-based solution flow range, then process water from the water supply circuit and polymer-based solution from the polymer-based solution supply circuit are simultaneously, or substantially simultaneously diverted to a first mixer. Compressed air is added to the mixed process water and polymer-based solution to produce air-entrained foam. In one embodiment, the process water, polymer-based solution and compressed air are directed to a second mixer for additional mixing. The air-entrained foam is directed to a discharge line and discharged into a wet or dry concrete composition to produce a cement composition including entrained or captured air.

In one aspect, the process includes receiving an order for a specified amount of air-entrained foam for a batch of concrete with the controller. The order may be electronically transmitted to the controller or manually entered with a local or remote user interface. The controller may then calculate a run time to produce the specified amount of air-entrained foam. The specified amount of air-entrained foam is produced under the control of the controller and discharged into a concrete batch and further deployed downhole. As the foam is produced and discharged, the pressure in the foam discharge line may be monitored and transmitted to the controller which compares the pressure to a preprogrammed pressure range. If the pressure in the discharge line varies from the preprogrammed range, the controller may initiate a preprogrammed set action such as annunciating a local or remote alarm and/or transmitting a signal to a remote central office indicating that the pressure in the discharge line has varied from the preprogrammed range. After the specified amount or volume of air-entrained foam is produced, any foam remaining in the discharge line may be purged with one or more pulses of compressed air to clear the line.

BRIEF DESCRIPTION OF THE DRAWINGS

For a more complete understanding, reference is now made to the following description taken in conjunction with the accompanying drawings in which.

DETAILED DESCRIPTION

Figure 1:
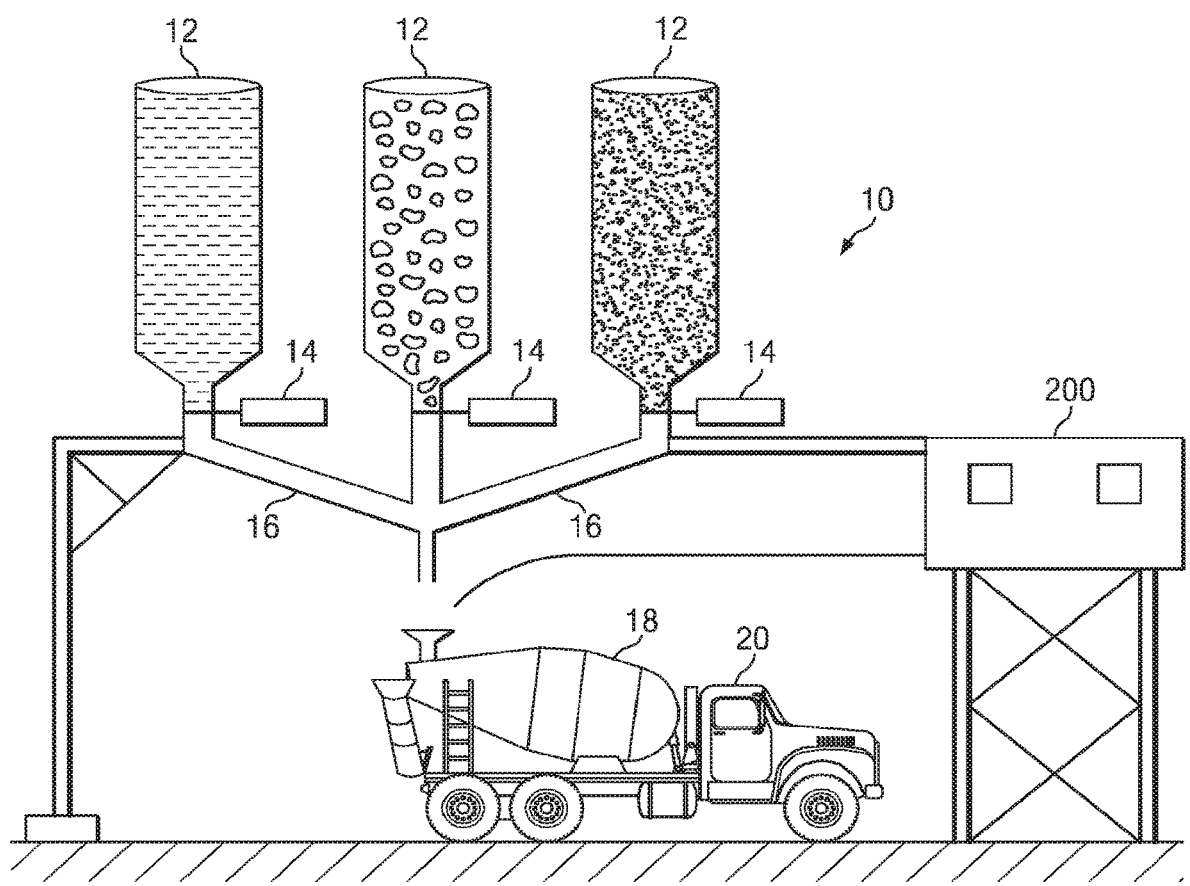
FIG. 1 is a schematic representation of a system utilized to produce a polymer-based foam for air entrainment in downhole injection.

Referring now to the drawings, wherein like reference numbers are used herein to designate like elements throughout, the various views and embodiments of a system, method and apparatus for entraining air in concrete for downhole injection are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 is a schematic representation of a concrete batch plant 10, often referred to as a ready-mix plant. A typical batch plant 10 may be provided with a number of silos or hoppers 12 for storing cement, sand, rock and other aggregates or material such as fly ash. Predetermined amounts of the different materials are discharged from silos 12 through gates 14 and chutes 16 into the rotating drum 18 of a concrete truck 20. Typically, control of the amounts of the various materials included in a batch is accomplished by opening gates 14 for predetermined time periods to discharge the desired volume of the materials.

Concrete batch plant 10 may be either a dry batch plant or a wet batch plant. In the case of a dry batch plant, the dry materials, e.g., cement, sand, stone, and other components, are loaded into truck 20 in a dry state and water is added thereafter. The dry materials and the water are mixed with the dry components by rotation of drum 18 of truck 20 en route to the job site. In the case of a wet batch plant, the dry components and water are mixed prior to the concrete being loaded in the truck.

In one embodiment, a system 200 is used in conjunction with concrete batch plant 10 to produce a concrete composition with entrained air for downhole injection. As used herein, a concrete composition includes batched concrete dry materials or wet batched concrete materials. System 200 uses compressed air, water and a polymer-based solution composition ("polymer-based solution") to provide a polymer-based solution foam that is added in predetermined amounts to concrete in order to entrain air in the concrete. Suitable polymer-based solution compositions for producing air-entraining foams are disclosed in U.S. Pat. No. 6,153,005 issued Nov. 28, 2000, to Welker, et al., the disclosure of which is incorporated herein by reference for all purposes. In the case of a dry batch plant, the foam may be discharged into truck 20 with or after the dry components have been loaded into the truck. In the case of a wet batch plant, the foam may be mixed with the concrete prior to the concrete being discharged into truck 20 or with the concrete as it is discharged into the truck. In other cases, system 200 may be remote from batch plant 10 in which case trucks 20 drive to the remote location where the foam is discharged into the trucks. In yet other applications, system 200 may be located at the job site such that foam may be mixed with concrete used at the work site such as drilling field.

It should be understood that, from the standpoint of an overall batch processing system for receiving an input product, mixing that product and providing the output product with, the above-disclosed system is a rather small batch process. In order to ensure the consistency of such a process, it is important to ensure that all of the constituents that are placed into the drum 18 are in such a state that they will mix correctly. For dry material such as cement sand and stone, this is relatively easy as they have a "static" state. However, the foam presents a different issue. It is necessary for the foam to be correctly mixed by the system 200 for the given batch. The reason that this presents an issue is that the foam requires multiple constituents and chemicals to be mixed in a very precise manner to achieve the correct consistency of the foam, etc. For small batches, the system is typically started up and the expectation is that the foam is produced in the correct mixture, etc. It is not possible to start the system up, run the process, determine if the consistency is right and then add it to the drum 18. It is desirable that the system starts up and produces the correct consistency, etc., for the mixture at the beginning of the start of the batch and at the end thereof. If the system were a continues running system, it would be possible to recalibrate the system as it is running, analyze the output and the various set points of all of the sub-processes that are employed in the overall process. It is difficult to provide feedback in realtime with a batch processing system that can analyze the properties of the resulting product and then make a determination as to what change must be made in order to correct for some deviation of the output product from a desired range. Thus, it is necessary to "fix" the process and control the sub-processes that make up the overall process rather highly, as will be described hereinbelow.

Figure 2:
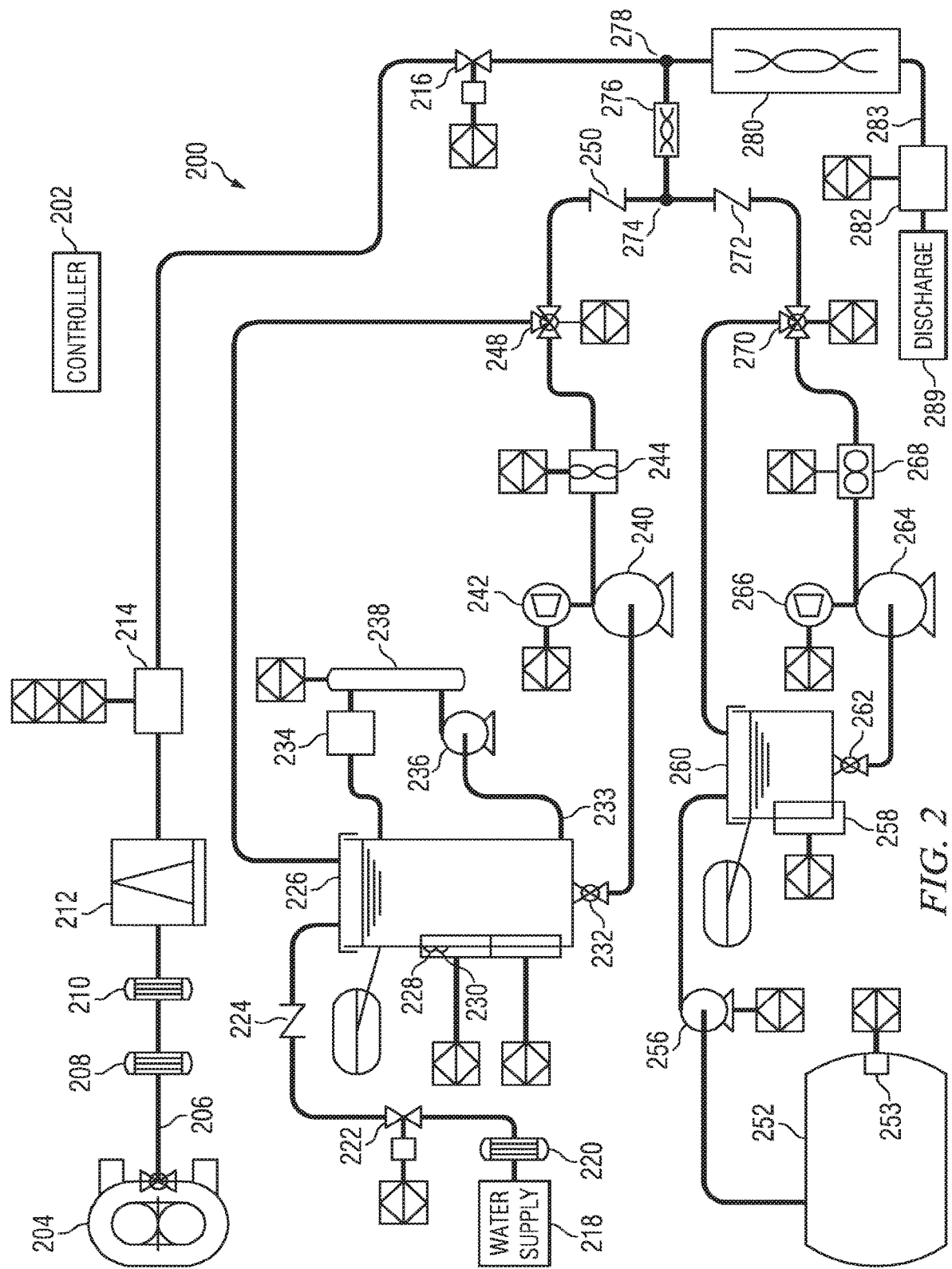
FIG. 2 is a diagrammatic representation of one variation of a system for producing a polymer-based solution foam for entraining air in concrete.

FIG. 2 is a schematic representation of one variation of a system 200 for producing a polymer-based solution foam, also referred to as an air-entrained foam, to entrain air into concrete further deployed dowhole. System 200 is controlled with a local system controller 202 which, in one embodiment, may be a programmable logic controller (PLC). In other embodiments, local system controller 202 may be a microprocessor provided with appropriate software and firmware.

In one variation, system 200 utilizes an air compressor 204 for providing compressed air to produce the polymer-based solution foam. Compressed air from compressor 204 is controlled by local system controller 202 to produce compressed air on demand. Compressed air from compressor 204 is directed through air line 206 through a water separator 208, after which the compressed air is directed through a particulate filter 210 to remove any entrained particulates in the air. The compressed air is then directed to an air dryer 212 such as a regenerating desiccant type dryer or similar air dryer.

Compressed, filtered and dried air from dryer 212 is directed to a pressure regulator 214 operating under the control of local system controller 202. Pressure regulator 214 controls the pressure of the air mixed with water and the polymer-based solution to produce foam. Pressure regulated air from regulator 214 is directed through a valve 216 that operates under the control of local system controller 202. In one embodiment, valve 216 is a solenoid-type control valve that is either in the open or closed position, depending upon whether foam is being produced at that point in time.

Water for the foam generation process is supplied from a process water supply circuit generally designated as 215. Process water from the supply circuit is directed through a filter 220. A water supply valve 222 operating under the control of local system controller 202 is opened and closed to supply process water to a process water storage tank 226. A check valve 224 is provided to prevent any possible backflow. Process water storage tank 226 is provided with a level indicator 228 and a temperature sensor 230. Local system controller 202 utilizes the signal from level indicator 228 to open and close water supply valve 222 based upon three set points; a high level set point, a fill set point and a low level shut off set point. If the water level in process water tank 226 drops below the fill set point, valve 222 is opened to supply additional water to the tank. If the water level in process water tank 226 reaches the high level set point, valve 222 is closed. If the water level in process water tank 226 falls below a predetermined low level shut off set point, system 200 will be shut down or alternatively will not be allowed to start up until sufficient water is added to process water tank 226.

The temperature of process water used to produce foam is controlled with a closed loop circulating system designated 235. A temperature sensor 230 is used to determine if the temperature of process water stored in process water tank 226 is at or within an acceptable range around the temperature set point for the water temperature. The output from sensor 230 is used by local system controller 202 to start or stop a circulating pump 236 and to energize a water heater 238. Circulating pump 236 circulates water from process water supply tank 226 through heater 238. A flow switch or flow meter 234 is used to ensure that the process water is being circulated through recirculating line 233, pump 236 and heater 238 before the heater is energized under the control of local system controller 202. In some embodiments, a water cooler or refrigeration unit (not shown) may be used in place of, or in conjunction with water heater 238 to cool process as necessary to control the temperature of the water.

Temperature controlled process water from tank 226 is supplied through a manual outlet valve 232 to a process water supply pump 240. In one embodiment, process water supply pump 240 is a vane-type, positive displacement pump driven with a variable speed drive 242 controlled by local system controller 202. Other metering pumps may be suitable. Local system controller 202 uses a signal from a flow meter 244 located down stream from supply pump 240 to increase or decrease the speed of variable speed drive 242 to increase or decrease water flow based on a predetermined set point. Process water pumped by pump 240 through flow meter 244 is directed to a process water three way valve 248. In its normal operating position, process water three way valve 248 recirculates process water back to process water supply tank 226 until such time as system 200 is activated to produce foam. When system 200 is activated to produce foam, valve 248 is repositioned to direct process water through a check valve 250 to a mixing point 274 where the process water mixes with a polymer-based solution. When system 200 is shut down, valve 248 is moved to the closed position.

Concentrated bulk aqueous-based solution for use in system 200 may be stored in a bulk storage tank 252, the level of which is monitored by local system controller 202 with a level sensor 253. In one embodiment, polymer-based solution from bulk storage tank 252 is pumped to a polymer-based solution batch tank 260 using a bulk polymer-based solution pump 256 operating under the control of local system controller 202. Polymer-based solution batch tank 260 is part of a polymer-based solution supply circuit 261 used to supply polymer-based solution to a polymer-based solution circulating loop 263. Local system controller 202 uses a signal from a level indicator 258 in polymer-based solution batch tank 260 to determine the volume of polymer-based solution in the batch tank and to add additional polymer-based solution to the batch tank as necessary based on a preprogrammed set point.

From batch tank 260, polymer-based solution flows through a manual outlet valve 262 to a polymer-based solution supply pump 264. Polymer-based solution supply pump 264 is typically a vane-type positive displacement pump powered by a variable speed drive 266. Local system controller 202 uses a signal from flow meter 268, located down stream from polymer-based solution supply pump 264, to increase or decrease the speed of variable speed drive 266 thereby increasing or decreasing the flow of polymer-based solution based on a preprogrammed set point. This allows the system to produce variable volumes (amounts) of air-entrained composition of constant density and to account for the changes in hydrostatic pressure downhole. The polymer-based solution then flows to a three way polymer-based solution supply valve 270. Three way polymer-based solution supply valve 270 may be positioned to recirculate polymer-based solution back to polymer-based solution batch tank 260 or to direct the polymer-based solution through a check valve 272 to a tee or mixing point 274 where the polymer-based solution is mixed with process water.

The polymer-based solution and process water from tee 274 is directed through a mixing chamber 276 after which air is injected into the water/polymer-based solution stream at a second tee or mixing point 278. The polymer-based solution/water/air mix is then directed into a stationary mixer 280 to produce the polymer-based solution foam, which in turn is deployed into the wellbore to set as a cement column having a constant density or a varying density, if a single gas-to-base slurry ratio is utilized. In one embodiment, stationary mixer 280 is packed with a stainless steel or mesh or similar mesh to ensure adequate mixing of the polymer-based solution, water and air. It will be appreciated that one or more additional stationary mixers may be used down stream of stationary mixer 280 to further condition the mixture to provide the desired bubble size and consistency of foam.

As illustrated, a pressure sensor 282 is provided on foam discharge line 283 down stream of stationary mixer 280 and before discharge point 289. The signal from pressure sensor 282 is input to local system controller 202. The pressure measured by sensor 282 is compared to a preprogrammed value to determine whether system 200 is operating properly. If the inputs of one or more components, e.g., air, water or polymer-based solution, are interrupted or drift off of preprogrammed set points, the variance will be reflected in the pressure measured by sensor 282. For example, if the polymer-based solution supply is interrupted, the viscosity of the mixture flowing through discharge line 283 will change, changing the pressure in the line. In this event, local system controller 202 may be configured to shut down the process until the source of the variation can be identified and corrected.

In one embodiment, the components of system 200, (with the exception of air compressor 204, bulk storage tank 252 and water supply 218) may be housed in a single cabinet that may be transported to the drill site by means of a flatbed trailer that is positioned adjacent to the drilling apparatus and left onsite during well completion. In other variations, system 200 may be mounted directly on drilling platform. It will also be appreciated that the use of system 200 may allow for the use of fly ash in the base slurry thereby producing a slurry with more desirable flow properties. System 200 may also be used to reduce the amount of Portland cement used in the base slurry insofar as slurry having more consistent chemical and physical properties may be produced, especially in the case wherein fly ash is used as a component of the base slurry.

This configuration permits the system to be deployed rapidly and conveniently and/or moved from one location to another as needed. In this embodiment, the physical sub-processes, i.e., the water supply circuit 215, the polymer solution supply circuit 262 and the compress air supply (regulator 214) are in close physical proximity (closely coupled) such that no long pipe or tubing runs are required to connect the sub-processes in the system.

Figure 2A:
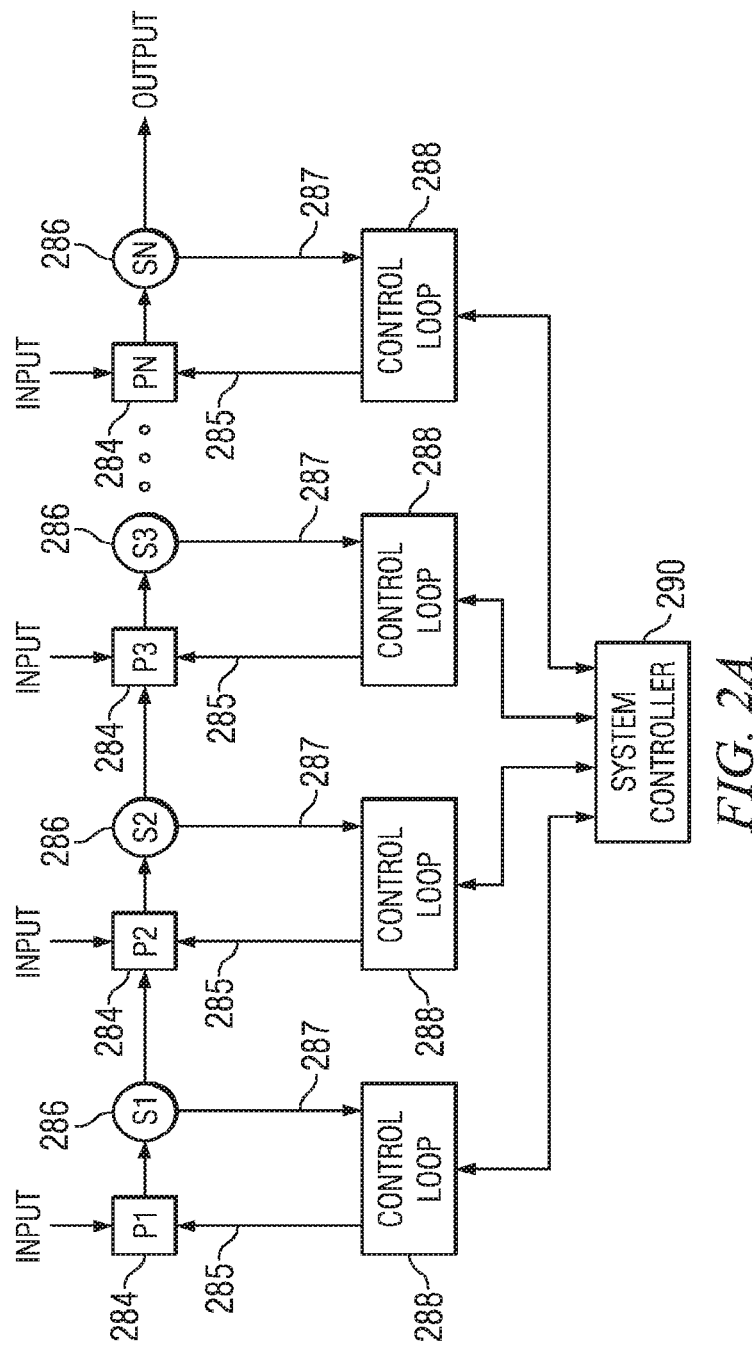
FIG. 2A is a simplified diagrammatic representation of the general control system.

Referring now to FIG. 2A, there is illustrated a simplified diagrammatic view of the general control system that operates in accordance with that described with respect to FIG. 2. In general, this control system is comprised of a plurality of sub-controllers each controlling a sub-process of the overall process. For example, one process involves water circulation where water is continually circulated and maintained at a constant flow rate and temperature. This requires a motor for a pump to operate at a speed to produce the desired flow. When the process is control of the circulating pump for the polymer-based solution, which keeps the polymer-based solution circulating at a set flow rate, the process must be controlled to operate at a constant flow rate. It is important to note that, when this system starts up, all temperatures, pressures and the such are maintained at a "ready" status. Thus, the pressure with respect to the polymer-based solution is maintained within a defined set of constraints within the polymer-based solution circulating loop 263 such that, when valves 248, 270 are opened, polymer-based solution and water are delivered at the correct pressure and flow rate. This ensures that mixing occurs at the right temperature and flow rate without requiring adjustments after mixing has begun.

Further, with respect to FIG. 2A, there is illustrated a plurality of sub-processes 284. Each of these processes 284 is illustrated as receiving some type of input and providing an output, one of these processes being, for example, a motor controller for a circulating pump. This would require the pump to receive some type of control signal on a line 285, which would determine the speed of the motor. As an input, the motor would have a load placed on it and it also would operate in a certain environment, this being an external input parameter. If the process is water temperature control, then the input would be heat and the process would be basically a heater to heat up the water. There would also be a flow control associated with the water. Each of the processes 284 would have associated therewith some type of sensor 286 to sense the associated measureable parameters. The sensor 286 would provide information back to a control group sub-controller 288 on a line 287. Each of the sub-controllers 288 comprises a sub-controller associated with the respective process for providing a control signal back on line 285. For a motor, the sensor would be the speed sensor and for the temperature process, this would be at a temperature sensor. For the motor, the control would be a speed control whereas for the temperature process, it would be a rheostat setting, for example.

Each of the sub-controllers 288 has set points associated therewith such as speed, for the motor control sub-process, temperature for the temperature sub-process, etc. These are self-contained loops that are only associated with that particular sub-process. However, all the sub-processes together will form one large process. However, there is no feedback from the output back to a system controller 290, which provides the set points for the sub-controllers 288. Thus, without such feedback, it is difficult for the temperature controller for the water, for example, to be integrated with the speed of any one of the motors to control the overall output. It is not that the output could not be analyzed and an output provided, but, rather, that in realtime this is not feasible. Therefore, each of the sub-controllers 288 for the sub-processes 284 in the overall process would be operating within defined constraints, this provided by the system controller 290 operating in conjunction with the associated sub-controllers 288.

On start up, as set forth hereinabove, some of the sub-processes 284, operate to maintain temperatures, pressures, etc. For example, a volume of water is continually circulated to maintain the temperature at a certain point and within a certain range. Further, the circulation pump 236 (FIG. 2) is running such that it does not have to come up to speed so that there is no lag associated therewith. Therefore, when the system is switched over to actually provide an output, i.e., mix the constituents together, the water is at the correct temperature, the motor is at the right flow rate, the polymer-based solution is at the right pressure and flow rate, etc. Since the connections there between are very short, this mixing is achieved very quickly at the "static" level set by the various set points in each of the sub-processes 284.

Again, there is no interrelationship between the sub-processes 284 such that they are not part of an overall control loop. Each of the sub-control loops 288 is local to a particular sub-process 284. When the system is set up, all of the set points for the various sub-processes 284 are tightly constrained and, once constrained, they are maintained within these constraints by the system controller 290. As long as these constraints are maintained, the output will have consistent properties. Of course, if one of the sub-processes 284 fails, there are sensors 286 that will indicate such, as described hereinabove.

Figure 3A:
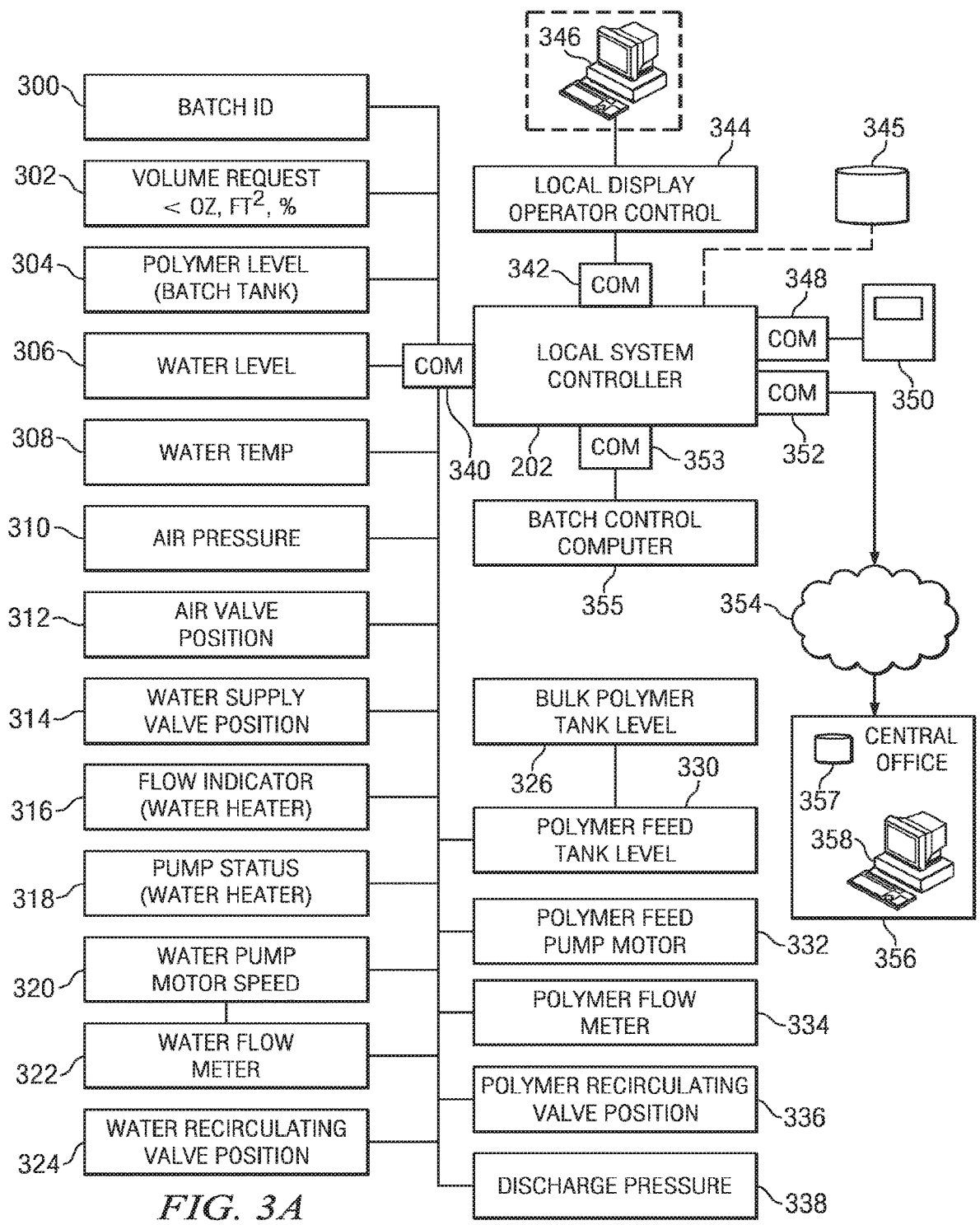
FIG. 3A is a diagrammatic representation of the system of FIGS. 1 and 2.

FIG. 3A is a diagrammatic representation of system 200 of FIGS. 1 and 2. As illustrated, local system controller 202 includes one or more communications interface(s) 340 for communication with a variety of instruments and controls. In one embodiment, a batch ID number 300 and a foam volume request 302 are input to local system controller 202 by the batch operator using a graphical user interface or similar device 346 which communicates with local system controller 202 via a communications interface 342. In other embodiments, different means or devices may be used to input the batch ID and the volume request to local system controller 202. For example, in the case of a batch plant controlled by a computer or processor 355, the batch ID number 300 and a foam volume request 302 may be automatically transmitted to controller 202 via a communications interface 353 upon receipt of an order or scheduling of a batch run.

Local system controller 202 receives a variety of instrument and control inputs to control the operation of system 200. Inputs to local system controller 202 may include the polymer-based solution level 304 in polymer-based solution batch tank 260 (FIG. 2), the water level 306 in process water storage tank 226, and the water temperature 308 of the water in the tank. Additional process parameters input to local system controller 202 may include process air pressure 310 as measured at pressure regulator 214 (FIG. 2), the position 312 of air valve 216 and the position 314 of water supply valve 218. In order to control the operation of process water heater 238, local system controller 202 receives an input 316 from a flow meter indicating whether water is flowing through the heater along with an input 318 indicating the status of circulating pump 236 that directs water through the heater.

In order to control the operation of process water supply pump 240, local system controller 202 receives an input 322 from water flow meter 244 which is used to control the speed 320 of variable speed drive 242 of process water supply pump 240. Local system controller 202 also receives an input 324 indicating the position of three way water recirculating valve 248. In connection with the supply of polymer-based solution to system 200, controller 202 receives an input 326 from a level sensor 253 indicating the level of polymer-based solution in bulk storage tank 253, an input 330 from level indicator 258 indicating the level of polymer-based solution in batch tank 260, and an input 332 indicating the speed of polymer-based solution feed pump 256 and/or the speed of the motor driving the pump. As previously noted, polymer-based solution feed pump 256 supplies polymer-based solution to polymer-based solution batch tank 260 under the control of local system controller 202.

To control the flow of polymer-based solution to the process, local system controller 202 receives an input 334 from polymer-based solution flow meter 268 and from variable speed drive 266 which drives polymer-based solution supply pump 264. Local system controller 202 also receives an input 336 from three way chemical recirculating valve 248 indicating whether the valve is closed, in a position to recirculate polymer-based solution back to polymer-based solution batch tank 260 or to direct polymer-based solution to mixing point 274 where the polymer-based solution is mixed with process water. In order to monitor the overall operation of the system 200, controller 202 receives an input 338 from a pressure sensor 282 located in the foam discharge line 283. If the flow of water, air or polymer-based solution is interrupted or varies from a preprogrammed set point, the interruption or variation will result in a change of pressure in discharge line 283.

A communications interface 342 enables local system controller 202 to communicate with a local display and operator control module 344 which may include a graphical user interface 346. Graphical user interface 346 may be used by the batch operator to enter information such as a batch ID, a requested volume or quantity of foam to be incorporated into a batch of concrete or to override the operation of local system controller 202 and/or adjust operating parameters such as flows or motor speeds to produce variable volumes (amounts) of air-entrained cement of constant density to account for hydrostatic changes in a wellbore. In one embodiment, local system controller 202 includes a communications interface 348 connecting the controller to a portable control unit 350. Portable control unit 350 may be used by a batch operator or, for example, a semi-truck driver to initiate or stop operations of system 200, to enter a batch ID number or a truck ID number. This feature may be particularly useful in the case where system 200 is located remote from the concrete batch plant. Portable control unit 350 may also include a bar code scanner, RFID reader or similar device for identifying trucks as the trucks are queued and/or loaded with concrete.

Local system controller 202 may also include a communications interface 352 enabling the controller to communicate with a remote central office 356. The communications link with the remote central office 356 could be made through a public or private network such as the internet, a dedicated WAN or through a dial up modem, which would be a much slower data link. In one embodiment, communications interface 352 is an Ethernet module enabling communications between local system controller 202 and remote central office 356 via a public or private network 354 such as the internet.

Remote central office 356 may include a user interface 358 enabling realtime monitoring of the operation of system 200 including operating parameters such as temperatures, flows, pressures and valve positions. In one variation, user interface 358 may be a touch screen. In other embodiments, user interface 358 may be a display and a keyboard or a similar input device. Information such as batch IDs, volume requests, the date and time at which a batch was prepared, alarms and/or overrides by a local operator may be logged. Graphical user interface 358 may also be used to make adjustments to operating parameters such as pump motor speeds or valve positions from the remote central office 356. Finally, any alarms triggered as a result of interruptions or variations from set point(s) in the process may be annunciated on graphical user interface 358 and logged at the remote central office 356 on a data storage device 357 for future reference.

Figure 3B:
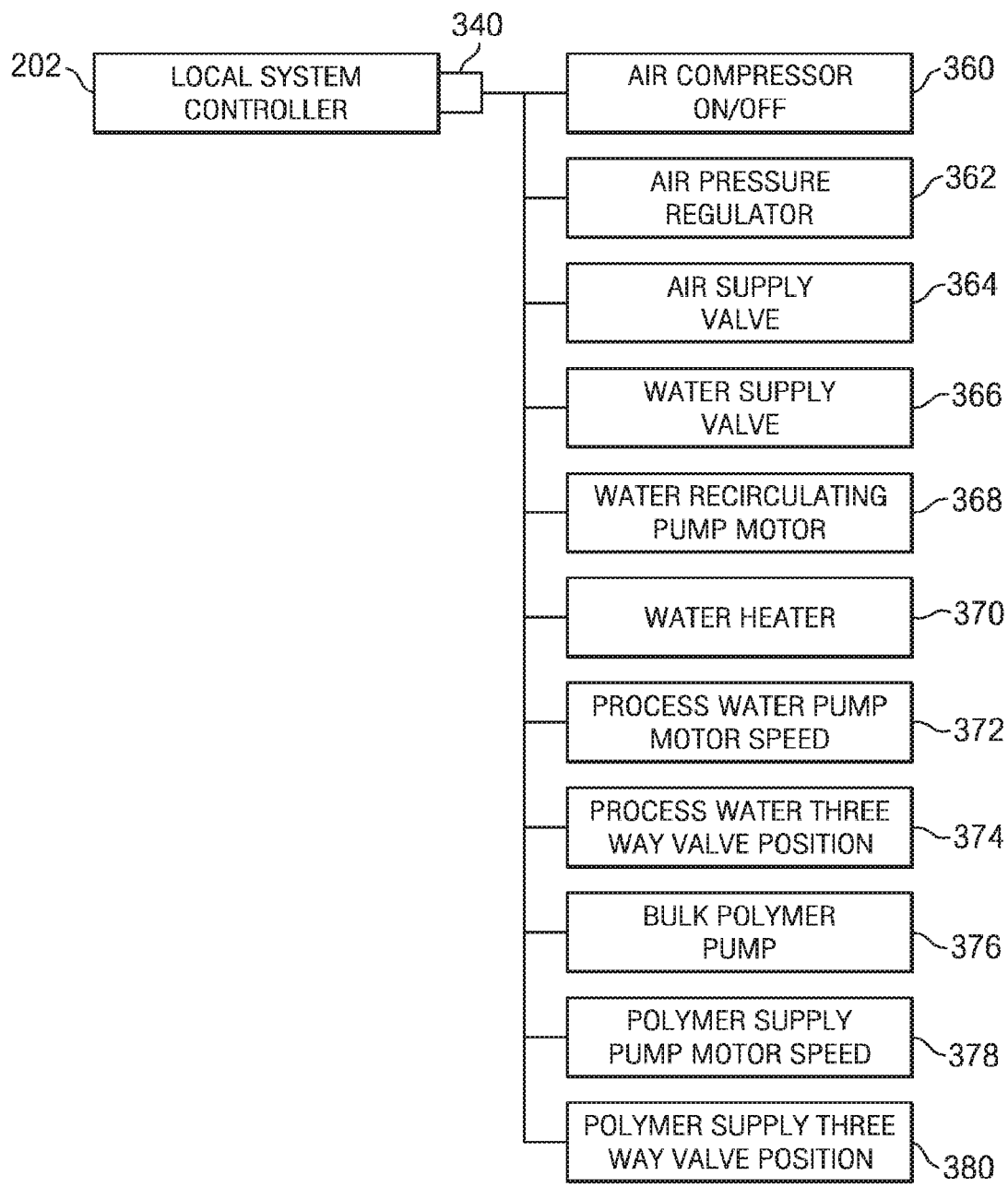
FIG. 3B is a diagrammatic representation of the system of FIGS. 1 and 2, illustrating one configuration of control paths.

FIG. 3B is a diagrammatic representation of the system of FIGS. 1 and 2, illustrating one configuration of control paths for the system. As illustrated, local system controller 202 is provided with one or more communications interfaces 340 for transmitting control signals to components of system 200. Local system controller 202 may send a control signal 362 to air pressure regulator 214 including a pressure set point for the air supplied to system 200. Local system controller 202 may also control the position of air supply valve 216 by means of a signal 364 setting the position of the valve. In one embodiment, valve 216 is a solenoid operated valve which may be set to an open or closed position.

A signal 366 from local system controller 202 controls the position of water supply valve 222 based on the water level in process water tank 226 as previously described. Control signals 368 and 370 control the operation of water recirculating pump motor 236 and water heater 238. As previously noted, water heater 238 is used to heat the process water in process water tank 226 to a predetermined desired temperature. A flow switch on meter 234 (FIG. 2) is used to ensure that water is circulating through water heater 238 before the heater is energized.

The flow rate of process water in system 200 is controlled by a signal or set point 372 transmitted from local system controller 202 to variable speed drive 242 which drives process water supply pump 240. The speed at which process water supply pump 240 is driven may be adjusted based on a signal from flow meter 244 to local system controller 202. Local system controller 202 also generates a control signal 374 to control the position of the three way valve 248 which may be closed, positioned to recirculate water back to process water tank 226 or to direct process water through check valve 250 to mixing point 274 where the process water is mixed with polymer-based solution.

The flow of polymer-based solution in system 200 is also controlled by local system controller 202. Local system controller 202 uses a signal from level indicator 258 and polymer-based solution batch tank 260 to actuate bulk polymer-based solution pump 256 as necessary to maintain the desired level of polymer-based solution in the batch tank. Polymer-based solution from batch tank 260 is supplied to the system by means of a polymer-based solution supply pump 264 which is driven by a variable speed drive 266 operating based on a control signal 378 received from local system controller 202. Control signal 378 may be adjusted to increase or decrease the speed of polymer-based solution supply pump 264 based on a signal from polymer-based solution flow meter 268 received by local system controller 202. Local system controller 202 also controls the position of three way polymer-based solution supply valve 270 by means of a control signal 380. As previously noted, polymer-based solution supply valve 270 may be positioned in a closed position, a recirculating position wherein polymer-based solution is recycled back to polymer-based solution batch tank 260 or to direct polymer-based solution to mixing point 274 where the polymer-based solution mixes with water.

Figure 4A:
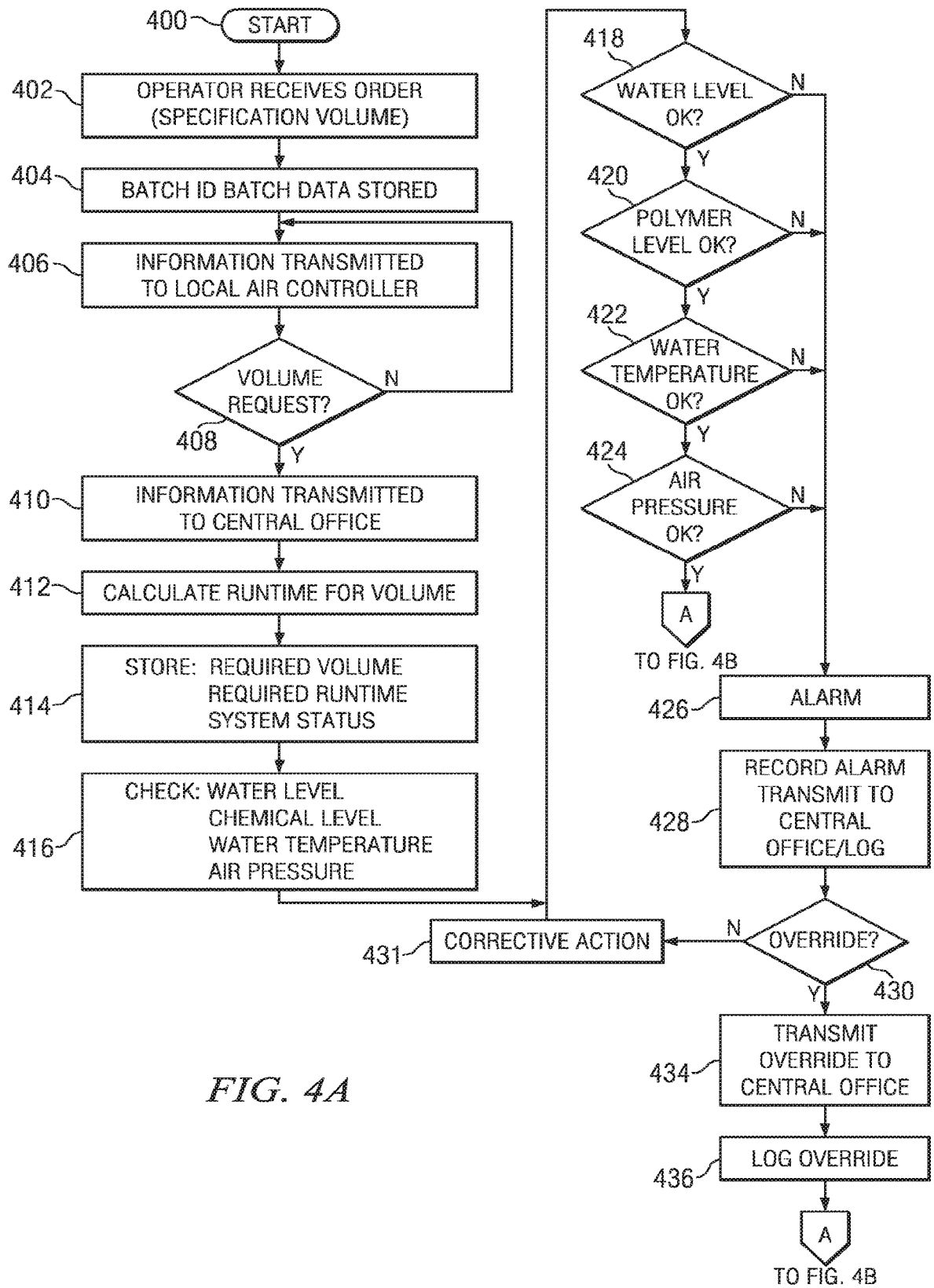
FIGS. 4A-4C is a flow chart illustrating an exemplary process using the system of FIGS. 1 and 2 to provide polymer-based solution foam for entraining air into concrete.
Figure 4B:
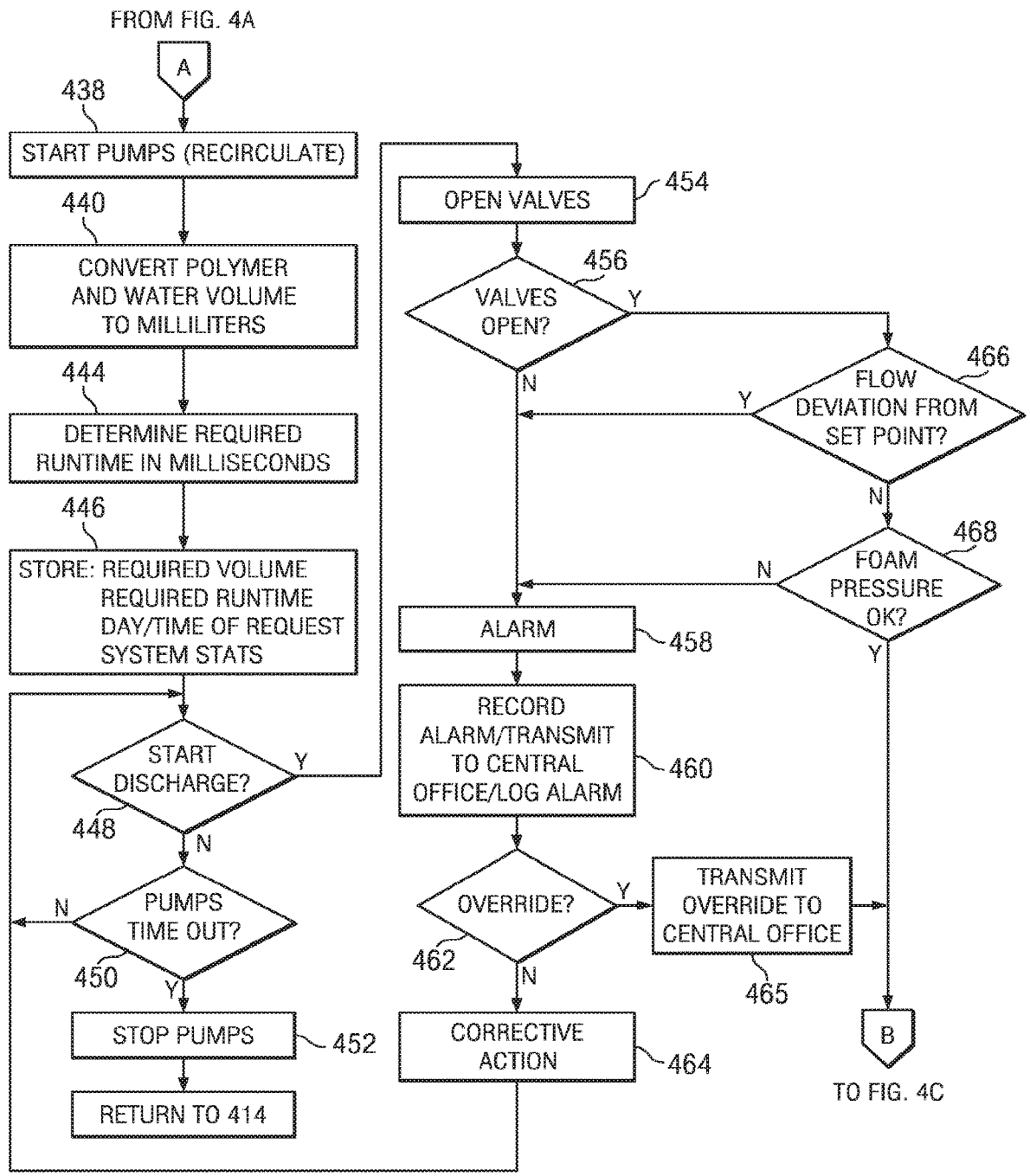
Figure 4C:
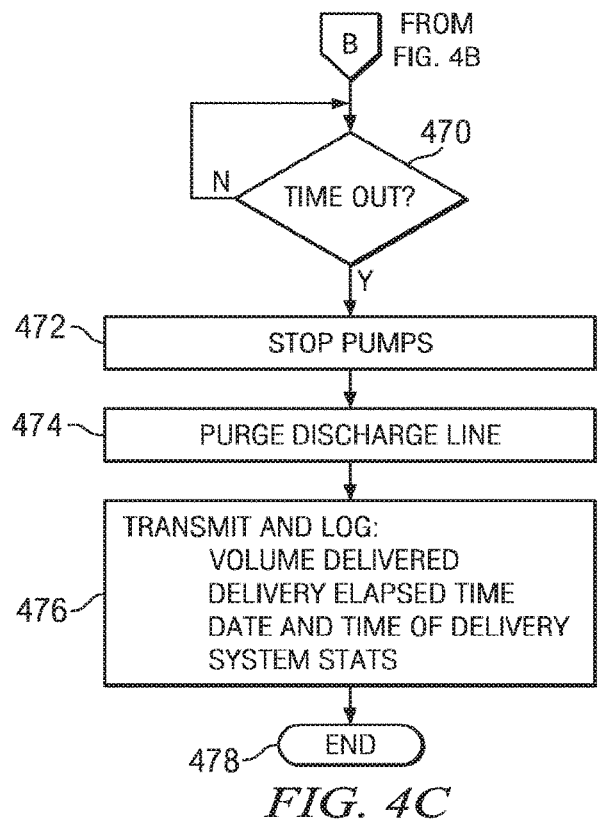

FIG. 4 is a flow chart illustrating an exemplary process using system 200 of FIGS. 1 and 2 to provide polymer-based solution foam for entraining air into concrete for a downhole injection. The process begins at step 400 and at step 402 a batch plant operator receives an order for a batch of concrete. Typically, the order will specify a particular type of concrete and/or the relative amounts of the different materials used to batch concrete. For example, the order may specify amounts of cement, fly ash, sand, rock and/or different additives such as plasticizers and retarders. The request will also typically include a specified volume of concrete required. At step 404 a batch ID may be assigned to the particular request and the batch ID along with the specifications for the batch may be recorded or stored by the batch plant operator. At step 406 information regarding the batch may be transmitted to local system controller 202. The information transmitted to local system controller 202 will typically include the batch ID, the volume of the batch (normally in cubic yards) and the volume of desired entrained air for the batch. The information may also be transmitted to a remote central office 356 where the information is stored in a database 357. Normally, the desired volume of entrained air will be specified in terms of a volume, e.g. cubic of air per yard of concrete or in terms of a percentage on a volume basis. The information may be transmitted to local system controller 202 via a data link between the controller and a batch control computer for the concrete batch plant. Alternatively, the information may be manually entered by the batch control operator using graphical user interface 346 (FIG. 3).

At step 408 a check is made to determine whether the transmitted information includes an air volume request. If not, the process loops back and the batch operator may be prompted to enter a volume request for the particular batch. In one embodiment, after the air volume request is received, the information for the batch may be transmitted to remote central office 356 at step 410. The information may include the batch ID, the date and time and the requested volume of entrained air for the batch. At step 412 the required run time to produce the volume of foam necessary to produce the desired amount of entrained air for the batch is calculated. For example, if the desired volume of entrained air is 2 cubic feet and the capacity of system 200 is 0.2 cubic feet per second, the required run time to produce the 2 cubic feet would be 10 seconds. The required run time to produce the requested volume and the system status are stored on local system controller 202 at step 414.

At step 416 the status of various system variables are determined. For example, the water level in process water tank 226, the polymer-based solution level in polymer-based solution batch tank 260, the temperature of the process water and the air pressure may be checked against preprogrammed set points. Turning to steps 418 through 424, if any of the aforementioned parameters are out of range an alarm may be annunciated at step 426. The alarm may be annunciated via graphical user interface 346 (FIG. 3) or an audio device associated therewith to alert the batch plant operator to the out of range parameter.

In one embodiment, system 200 is disabled and the alarm is locally recorded and transmitted to remote central office 356 at step 428. At step 430, the batch plant operator may make a decision to override the alarm or to take corrective action at step 431. Alternatively, the corrective action may be remotely initiated from remote central office 356. For example, by starting or adjusting a pump or opening or closing a valve. If the batch plant operator elects to override the alarm, the override may be transmitted to remote central office 356 at step 434 and be logged at step 436 after which the water and polymer-based solution supply pumps may be started at step 438. If the parameters checked in steps 418 through 424, e.g., water level, polymer-based solution level, water temperature and air pressure, are within preprogrammed ranges, local system controller 202 will automatically proceed to start the water and chemical pumps at step 438. It will be understood that when process water supply pump 240 and polymer-based solution supply pump 264 are started, the corresponding three way valves 248 and 270 are positioned to recirculate water and polymer-based solution back to their respective storage tanks.

In one embodiment, the required volumes of polymer-based solution and water are determined in milliliters for the purpose of accuracy and precise control. At step 440 if the required volume of process water and polymer-based solution has not previously been converted to milliliters, the required volumes are converted to milliliters. Turning to step 444, if the required run time to produce the desired volume of foam has not previously been calculated in milliseconds, the required run time is converted to milliseconds. In this embodiment, the flow rates of water and polymer-based solution used by system 200 will be in units of milliliters/milliseconds.

Referring now to step 446, the required volume of foam, the required run time to produce the required volume of foam, the date and time of the request and the system statistics are stored. This information may be stored locally on a data storage device 345 (FIG. 3A) associated with local system controller 202 and/or transmitted to remote central office 356 and stored on a data storage device 357 associated with the remote central office. At step 448 a start discharge signal may be received by or generated by local controller 202.

In one embodiment, local controller 202 initiates the start discharge command after a predetermined or preprogrammed time period, for example from about 30 seconds to about 2 minutes, beginning when the water and polymer-based solution supply pumps are started. The delay between starting the water and supply pumps and the start discharge command permits local controller 202 to make any adjustments to polymer-based solution or process flow rates necessary to stabilize the flows at the desired levels. In other embodiments, the start discharge command may be initiated by the batch plant operator using graphical user interface 346 or portable controller 350 after the preprogrammed time period beginning when the water and polymer-based solution supply pumps are started. In the event that the start discharge command is not received or initiated within a preprogrammed period of time after the polymer-based solution and water pumps have been started at step 450, a timer associated with the water and chemical pumps may time out after which, the pumps are stopped at step 452 and the process loops back to step 414.

At step 454, three way valves 248 and 270 (FIG. 2) corresponding to the process water and polymer-based solution feeds are opened to the discharge position. Air supply valve 216 is also opened. Polymer-based solution and water are mixed at tee 274, flow through mixing chamber 276 and are mixed at tee 278. The mixed air, foam and polymer-based solution are directed through a second stationary mixer 280 and discharged through discharge line 283. If local system controller 202 detects that water supply valve 248 or polymer-based solution supply valve 270 are not in the proper position at steps 456 and 466, e.g., open to discharge, an alarm will be annunciated at step 458. Similarly, if the discharged foam pressure as measured by pressure sensor 282 deviates from the preprogrammed range at step 468, an alarm will be annunciated at step 458. The alarm may be annunciated locally and/or transmitted to the remote central office 356 where the alarm is logged at step 460. At step 462, the batch plant operator may elect to override the alarm and/or take corrective action at step 464. If the batch plant operator elects to override the alarm, the override may be transmitted to the remote central office 356 at step 465 where the override is logged.

After system 200 has operated for the calculated run time to produce the desired amount of foam, the process will time out at step 470 and the water and polymer-based solution pumps will be stopped at step 472. Polymer-based solution supply valve 270 and water supply valve 248 will be closed or returned to the recirculating position. At step 474, air supply valve 216 (FIG. 2) will be pulsed one or more times to provide sufficient compressed air to purge discharge line 283 of any foam remaining in the line. At step 476, the volume of foam delivered, the elapsed time for delivery, the date and time of the delivery and selected system statistics may be stored locally and/or transmitted to the remote central office 356 and logged at the remote central office. At step 478, the process is ended and system 200 is reset to prepare the next batch of foam.

Figure 5:
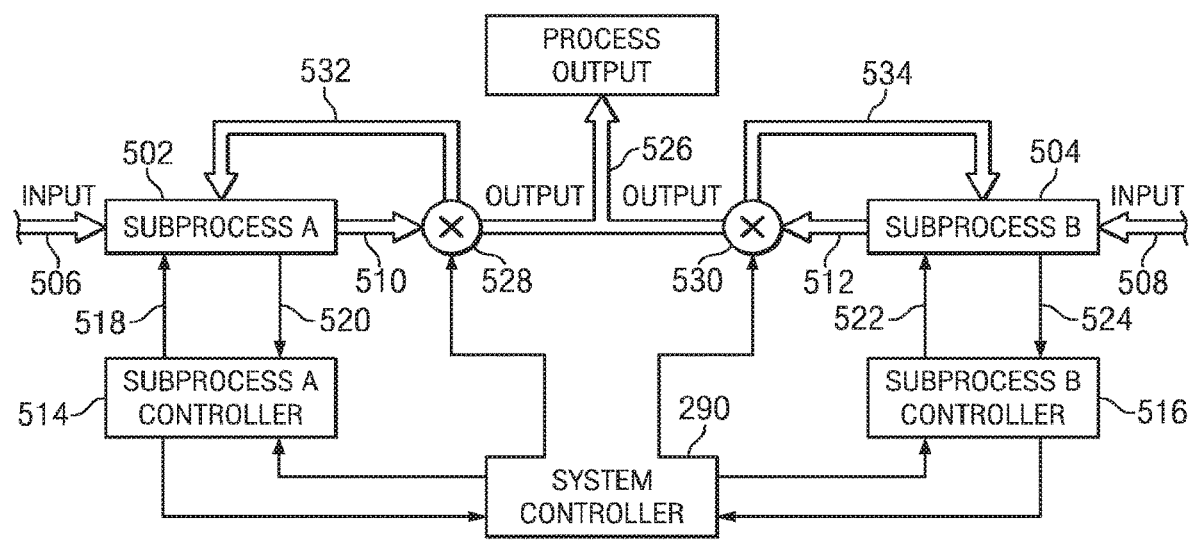
FIG. 5 illustrates a detail of the process flow as illustrated in FIG. 2A.

Referring now to FIG. 5, there is illustrated a simplified diagrammatic view of the process flow described and illustrated with respect to FIG. 2A hereinabove. In this process flow, there are illustrated only two sub-processes 284. There are illustrated a sub-process A, reference numeral 502 and a sub-process B, reference numeral 504. Each of these sub-processes 502 and 504 are illustrated as having an input 506 associated with sub-process 502 and an input 508 associated with sub-process 504. Each sub-process also has a respective output 510 for sub-process 502 and output 512 for sub-process 504. Each of the sub-processes 502 and 504 are controlled by a respective sub-process controller 514 and 516. The sub-process controller 514 has a control input 518 that controls sub-process 502 and a return path 520 for closing the loop. Thus, the sub-process controller 514 will send control signals to sub-process 502 and receive sensory inputs or state inputs from the sub-process 502. As described hereinabove, this is a self-contained process wherein the sub-process controller 514 has associated therewith parameters that define the set points for that sub-process 502. The control signals provided to sub-process 502 will control the process to meet those set points. As described hereinabove, these set points could be motor speed, fluid pressure, temperature, etc. The sub-process controller 516 operates in a similar manner with a control input 522 and a return path 524.

Each of the sub-processes 502 and 504 are part of an entire overall process. When operating as an integrated process, a process output 526 will be provided. However, as further described hereinabove, each of the sub-processes is tightly coupled to the overall process such that, each is operating at its particular set points as defined by its associated sub-process controller 514, 516, the overall process output 526 will operate at an expected value. In addition to being tightly coupled from a process standpoint, each of the sub-processes 502 and 504 (keeping in mind that many processes could be involved and only two are illustrated for exemplary purposes) are tightly coupled from a physical standpoint. Each of the sub-processes 502 and 504 operate in an integrated and a non-integrated mode. In the non-integrated mode, all of the sub-processes are physically decoupled from each other but continue to run in accordance with the operation defined therein by the associated sub-process controllers. The goal is that, when switching from a non-integrated to an integrated mode, the delay for the output process 526 to become "stabilized" is minimal. By running each of the sub-processes at the desired set points and controlled in accordance with the sub-process controller in a non-integrated mode, by switching to an integrated mode, they will "seamlessly" integrate together to provide the expected output in a very short period of time.

In many embodiments, the present system is utilized in small batch processing. For example to add 6 percent air (volume basis) to a typical 10 cubic yard truck load of concrete would require approximately 16.2 cubic feet of foam. In some embodiments, a system 200 such as illustrated in FIG. 2, may produce this amount or batch of foam in a very short period, for example 15, 30 or 45 seconds depending upon on the specific configuration of the system.

This short batch time is desirable from a throughput basis, for example when adding batches of foam to a series of truck loads of concrete in rapid succession. However, since the amount of air-entrained foam added impacts the strength of the concrete product, such time-constrained, small batch processing requires that the system produce foam with the desired composition and properties almost instantly when the batch is initiated.

Thus, in the case of time-constrained small batch processing as described herein, it is important that, when the batch process is initiated (when the sub-processes are integrated), that the output will immediately be at a stabilized process level. This prevents the long and expensive time lag between stabilizing an output processor if all of the sub-processes are started up in an integrated mode. To achieve this, each of the sub-processes must be stable in the nonintegrated mode and, when switching to the integrated mode, they must be tightly coupled such that, from a physical standpoint, all of the processes integrate to combine in a very seamless mode. For example, when fluid is to be delivered from one process to another process, i.e., to a mixing chamber, for example, it is important that the fluid be delivered thereto at a particular pressure and temperature. As long as fluid pressure is stable and the temperature is stable prior to switching from a non-integrated mode to an integrated mode, the expectation is that the fluid will be input to the mixing process at the appropriate fluid pressure and temperature. Additionally, in the mixing process, there might be air that is provided at a certain temperature, pressure and humidity level which, in the non-integrated mode, is stabilized prior to switching to the integrated mode. Once both of these are switched, it is important that there be little or minimal lag in the fluid being delivered to the mixing chamber and, as such, the mechanical (valves, tubing, etc.) connections between the two sub-processes is minimized.

Returning to FIG. 5, there is illustrated two mixing valves 528 and 530. Mixing valve 528 is operable to receive the output 510 from sub-process 502 and either divert it to a path 532 or to the output process path 526. The valve 528 is controlled by the system controller 290. The valve 530 is operable to receive the output 512 from sub-process 504 and either divert it to a path 534 or to the output process path 526. This output process path 526 for a multiple process system could be another process wherein that process requires two inputs. However, for simplicity purposes, this is illustrated as a two sub-process system.

The paths 532 and 534 represent a closed loop stable system operating in a non-integrated mode. This path could loop around back to the sub-process or it could divert to some type of reservoir. For example, if it were necessary to provide air to the process output 526 at a particular pressure, temperature and humidity, the air could merely be exhausted to the outside as opposed to recirculating it. For a fluid delivery mode, the fluid could merely be circulated from a holding tank through a particular conduit at a particular pressure and temperature. Once the pressure and temperature of the fluid were stabilized, this would represent a stable operation of that particular sub-process in a non-integrated mode.

The system controller 290 is operable to provide to each of the sub-process controllers 514 and 516 parameters for operation thereof and also receive therefrom monitoring information, i.e., information as to whether the sub-process controller is in a stable mode, etc. In actuality, the system controller 290 and the sub-process controllers 514 and 516 are all part of a single overall controller, wherein the operations therein are virtual operation. However, each of these operations is independent and the system controller 290 can control these processes to operate in an integrated mode and a non-integrated mode. As will be described hereinbelow, when switching from a non-integrated mode to an integrated mode, the parameters may change such that, in the non-integrated mode, there is one set of parameters for pre-integration and, after entering into integrated mode of operation, wherein the total process is "blended," an additional set of parameters may be provided such that the parameters of a particular sub-process are changed, i.e., the pressure of the fluid is incrementally changed, the temperature is changed or the flow rate is changed.

Again, by tightly coupling each of the sub-processes in the overall process both from a process standpoint and from a physical standpoint, the sub-process can be stabilized prior to initiating a batch mode and, when the batch mode is initiated, there will be a seamless transition to a stable process output such that small batches can be accommodated for a duration of time. Further, when switching from an integrated mode to a non-integrated mode, the sub-process can be maintained in a stable operating condition such that switching from non-integrated to integrated, i.e., going to the batch mode, can be switched back and forth multiple times.

Figure 6:
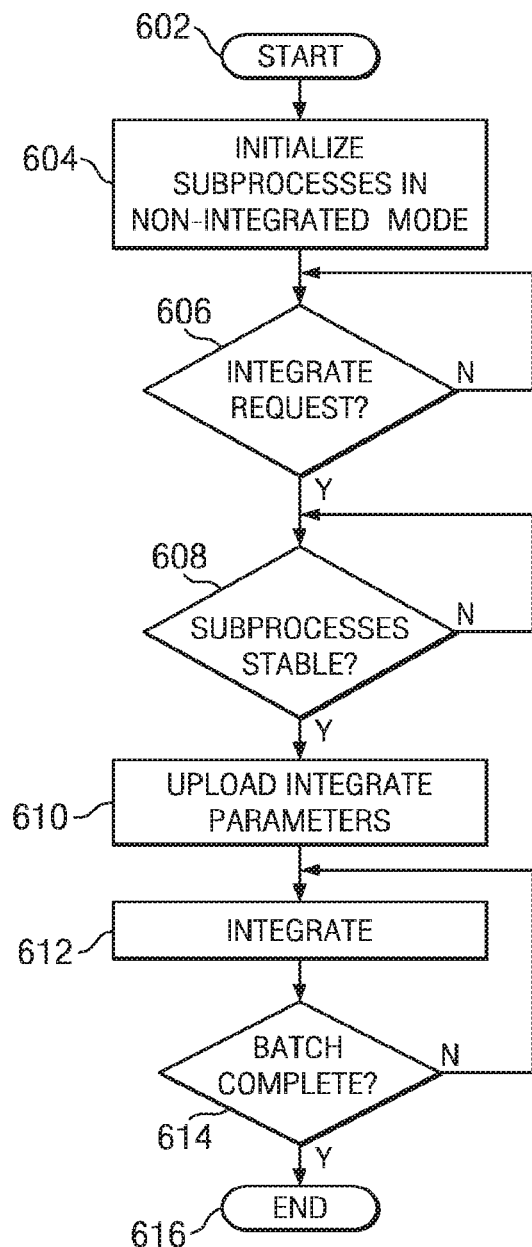
FIG. 6 illustrates a process flow for running integrated and non-integrated process flows.

Referring now to FIG. 6, there is illustrated a flow chart depicting the operation of a particular sub-process in integrated and non-integrated modes. The program is initiated at a start block 602 and then proceeds to a function block 604 wherein a particular sub-process is initiated, this being in the non-integrated mode. This is initiated by the system controller 290, which basically uploads the parameters to the sub-process controller associated with a particular sub-process and the sub-process will "ramp up" to its operating points. This will allow the process to stabilize at its particular set point. It may be that the operation from initialization to stabilized operation will require some ramping of things such as motor speed, temperature, etc. The sub-process in the overall process will receive some type of integrate request from the system controller 290. This integrate request will normally not be serviced until the sub-process is stable. Therefore, the operation of the sub-process will operate independently of the overall integration of the process until an integrate request is received, as indicated by a decision block 606. However, in one embodiment, the integrate request will not be serviced by the overall system unless the particular sub-process is stable, as indicated by a decision block 608. All the sub-processes should be stable before an integrate request can be serviced. This integrate request could be the mere pressing of a batch initiation by an operator. Of course, there will typically be status lights or other indicators associated with all of the sub-processors which would indicate to the operator that the batch should not be initiated. However, if the batch were initiated prior to the sub-process being stable, the batch may be delayed. Once the sub-process is stable, the program will flow to a function block 610 to upload integrate parameters. As noted hereinabove, it is possible that the parameters over the set point for the operation of a particular sub-process may change between the non-integrated mode and the integrated mode. If so, new parameters or set points would be uploaded to a particular sub-process when switching to the integrated mode. Once these are uploaded, the program will flow to a function block 612 to integrate the processes, i.e., the valves 528 and 530 of FIG. 5 would be switched to divert the outputs 510 and 512 to the process output path 526. The program will then flow to a decision block 614 to determine if the batch were complete, i.e., usually determined by a timer or indicated by the operator. Until the batch was complete, the program would loop back around to the input of function block 612 and, after the batch is complete, the program will flow to an end block 616.

Figure 7:
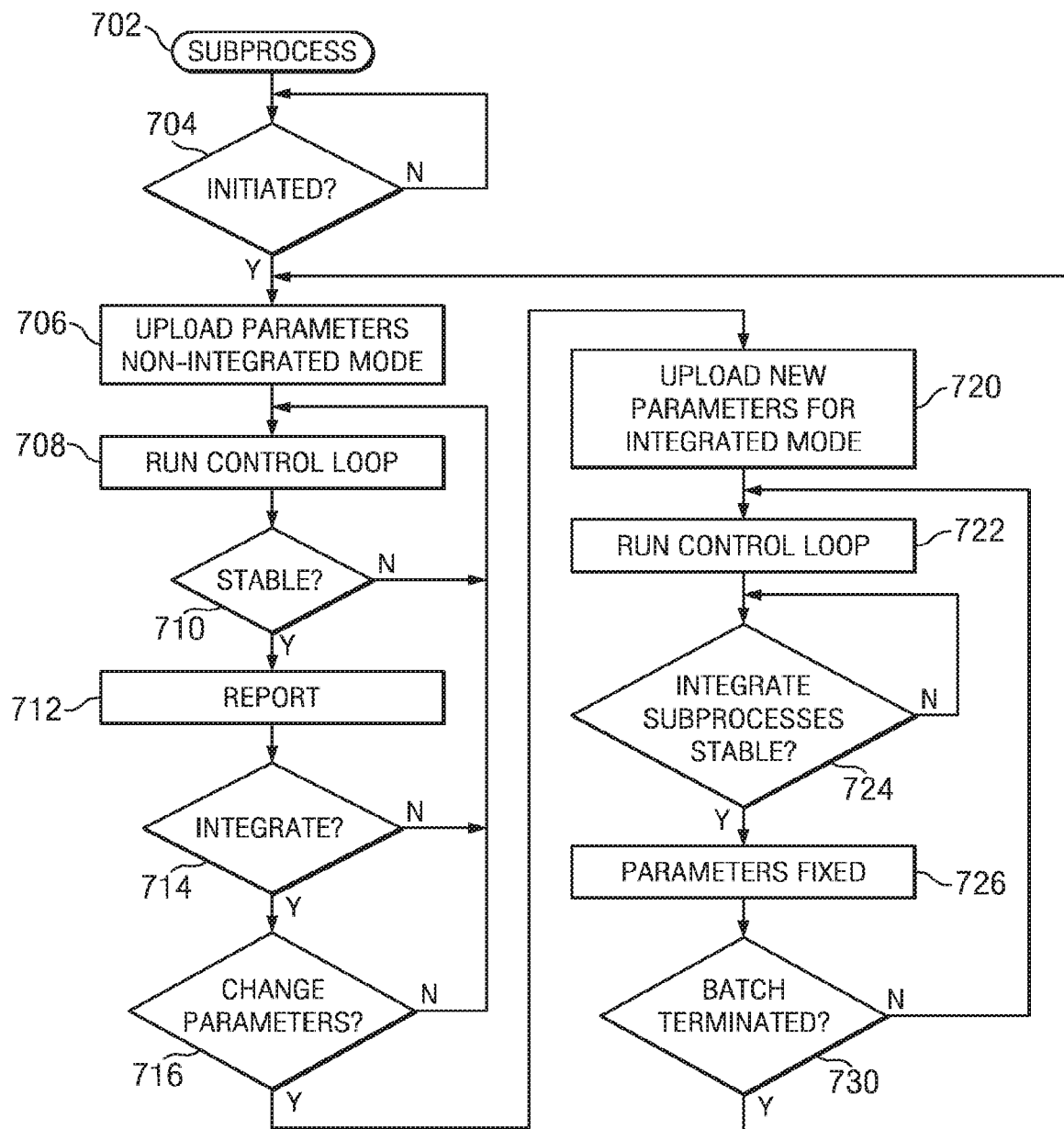
FIG. 7 illustrates a flow chart for the operation of the sub process when changing over from the non-integrated mode to the integrated mode.

Referring now to FIG. 7, there is illustrated a flow chart depicting the operation of the sub-process when changing from the non-integrated mode to the integrated mode. This is initiated at a block 702 and then proceeds to a decision block 704 to determine if the sub-process has been initiated, i.e., the sub-process has been started from a non-operating mode. When initiated, in response to a control signal sent by the system controller 290, the program then proceeds to a function block 706 to upload the parameters for operation in the non-integrated mode. As described hereinabove, it is possible for the non-integrated mode and the integrated mode for a particular sub-process operating independently to be different. Once the parameters have been uploaded for the operation of the sub-processer controlled by the associated sub-process controller, the program then flows to a function block 708 to run the control loop. This control loop can merely provide set points and control outputs and run the process until the set points have been met and the process is stable or the start up routine could involve some type of ramping, i.e., the set points are continually changed until they reach a desired set of set points. This will continue until the process is stable, which is determined at a decision block 710. When stable, the program flows to a function block 712 to report back to the system controller 290 that the sub-process is operating in the non-integrated mode in a stable condition, i.e., all temperatures, pressures, fluid flow rates, etc., are at the desired set points. The program then flows to a decision block 714 to determine if the sub-process is to enter into the integrated mode. For the most part, if the operation in the integrated mode and the non-integrated mode are the same, the sub-process does not change from one mode to the other. However, there are certain situations wherein the sub-process operation, i.e., the set points, will be different between the integrated mode and the non-integrated mode.

Once the integrated mode has been initiated, i.e., the operator has chosen to start the batch process, the program will flow to a decision block 716 to determine if parameters are to be changed. If not, then the system will maintain the control loop operation, as indicated by the function block 708. However, if the parameters are to be changed for the integrated mode, the program will flow along a "Y" path to a function block 720 in order to upload new parameters for the integrated mode. As noted hereinabove, this could be a situation wherein a mixing chamber which requires input from another sub-process during the integrated mode and input from a process that allows air to be entrained into the mixture from the first process would be combined. It may be that the pressure of the air or the flow of the air be reduced initially when the process is integrated and increased to ensure that the overall process output is maintained at a particular level. Therefore, these parameters could be provided to that sub-process.

Once the new parameters are uploaded, the program flows to a function block 722, similar to function block 708, to run the control loop and then to a decision block 724 to determine if the integrate sub-process is complete, i.e., is the process after the change in parameters stable in that it has reached the desired end set points. At this point, the parameters are fixed, as indicated by function block 726 and then the program will flow to a decision block 730 in order to determine if the batch has been terminated. At this point, the program will either continue in the batch operation to run the control loop from block 722 or, once the batch is terminated, then the parameters will be reset to the pre-integrated set points at function block 706 and the control loop will run with these parameters. It can be seen that, with this loop, the sub-process will continue to run even when the batch is terminated such that the batch can be started and stopped many times without waiting for the sub-processes to "ramp up."

It can be seen in the batch processing mode, that by tightly coupling the independent processors together to operate the processes from an integrated mode to a non-integrated mode and then tightly coupling the sub-processes from a physical standpoint, the sub-processes can be integrated in a seamless manner. This requires such things as diverter valves to be very tightly coupled from one process to the other such that diverted flow from one process in a non-integrated mode can be immediately changed to divert the flow from a non-integrated mode to an integrated mode such that the fluid will flow to the second process with very little lag time.

In one embodiment, the slurry may be produced in a continuous manner and pumped into the wellbore. In another variation, the slurry may be produced in a batch operation and stored in a holding tank (not shown) and pumped into a wellbore on as needed basis. In either variation, system 200 (as described above) is used to produce a foam that is admixed with the slurry in mixer 18 (FIG. 1). As described in detail above, a cement slurry including the required components, additives and a consistent controlled volume of entrained air is produced. It will be appreciated that the cement slurry produced in this fashion will minimize shrinkage and water bleed that may occur as the slurry sets in position in the bore. This in turn will prevent or minimize the formation of void spaces or channels between the casing and the wellbore thereby preventing or reducing gas leakage between the casing and the bore after the slurry has set in position.

It will be appreciated by those skilled in the art having the benefit of this disclosure that this system, method and apparatus for entraining air in concrete for downhole injection provides a means of entraining a controlled amount of air into batched concrete. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

The invention claimed is:

1. A system for making a foam comprising:
a set of mixers;
a water supply circuit switchably connected to the set of mixers;
an air entrainment solution supply circuit switchably connected to the set of mixers; the air entrainment solution supply circuit configured to recirculate a solution in a batch tank; the air entrainment solution supply circuit switchably separate from a mixing operation; and,
an air supply switchably connected to the set of mixers.

2. The system of claim 1, further comprising a discharge line connected to the set of mixers.

3. The system of claim 1, wherein the set of mixers further comprises:
- a mixing chamber; and,
- a stationary mixer connected to the mixing chamber.

4. The system of claim 1, further comprising a controller connected to the set of mixers, the water supply circuit, the air entrainment solution supply circuit, and the air supply.

5. The system of claim 4, wherein the water supply circuit further comprises:
- a set of water supply circuit detectors connected to the controller;
- a set of water flow meters connected to the controller; and,
- a set of water flow control devices connected to the controller.

6. The system of claim 4, wherein the air entrainment solution supply circuit further comprises:
- a set of solution supply detectors connected to the controller;
- a set of solution supply flow meters connected to the controller; and,
- a set of solution supply flow control devices connected to the controller.

7. The system of claim 4, further comprises a pressure sensor connected to the controller.

8. The system of claim 4, further comprising a graphical user interface connected to the controller.

9. The system of claim 1, wherein the water supply circuit further comprises:
- a water tank;
- a water supply controllably connected to the water tank;
- a temperature control loop connected to the water tank; and,
- a water circulation loop connected to the water tank and switchably connected to the set of mixers.

10. The system of claim 1, wherein the air entrainment solution supply circuit further comprises a storage tank controllably connected to the batch tank.

11. The system of claim 1, wherein the air supply further comprises:
- an air compressor;
- a water separator connected to the air compressor;
- an air filter connected to the water separator; and,
- an air dryer connected to the air filter and controllably and switchably connected to the set of mixers.

12. A foam production system comprising:
- a set of mixers;
- a water supply circuit switchably connected to the set of mixer;
- an air entrainment solution supply circuit switchably connected to the set of mixers; the air entrainment solution supply circuit configured to recirculate a solution in a batch tank; the air entrainment solution supply circuit switchably separate from a mixing operation;
- an air supply switchably connected to the set of mixers;
- a controller connected to the set of mixers, the water supply circuit, the air entrainment solution supply circuit, and the air supply;
- a process water circulated in the water supply circuit in a non-integrated mode;
- an air entrainment solution circulated in the air entrainment solution supply circuit in the non-integrated mode;
- a regulated air maintained in the air supply in the non-integrated mode; and,
- an air-entrained foam generated by the set of mixers from the regulated air, the process water, and the air entrainment solution in an integrated mode.

\* \* \* \* \*